United States Patent [19]

Raidel

[11] 4,309,045
[45] Jan. 5, 1982

[54] AIR SPRING SUSPENSION SYSTEM WITH PARALLELOGRAM STABILIZED AXLE AND ANTI-ROLL CONTROL

[76] Inventor: John E. Raidel, Rte. 9, Box 400-M, Springfield, Mo. 65804

[21] Appl. No.: 113,710

[22] Filed: Jan. 21, 1980

[51] Int. Cl.³ .................................... B60G 11/26
[52] U.S. Cl. .................................... 280/711
[58] Field of Search ............... 280/711, 697, 712, 713, 280/715, 104; 267/67, 64 R

[56] References Cited

U.S. PATENT DOCUMENTS

| | | | |
|---|---|---|---|
| 3,022,088 | 2/1962 | Mintz | 280/711 |
| 3,434,707 | 3/1969 | Raidel | 280/712 X |
| 3,477,739 | 11/1969 | White | 280/712 |
| 3,630,541 | 12/1971 | Carlson | 280/713 |
| 3,746,363 | 7/1973 | Borns | 280/713 X |
| 3,850,445 | 11/1974 | Bourns et al. | 280/712 |
| 3,909,036 | 9/1975 | Pound | 280/712 |
| 4,033,608 | 7/1977 | Sweet et al. | 280/711 |
| 4,089,544 | 5/1978 | Raidel | 280/715 X |
| 4,114,923 | 9/1978 | Raidel | 280/711 |
| 4,132,432 | 1/1979 | Raidel | 280/711 |
| 4,132,433 | 1/1979 | Willetts | 280/712 |
| 4,165,884 | 8/1979 | Allison et al. | 280/711 X |
| 4,178,015 | 12/1979 | Merriman | 280/711 |
| 4,181,323 | 1/1980 | Raidel | 280/711 |
| 4,181,324 | 1/1980 | Hixon | 280/713 |

Primary Examiner—David M. Mitchell
Assistant Examiner—Norman L. Stack, Jr.
Attorney, Agent, or Firm—Rogers, Eilers & Howell

[57] ABSTRACT

An air suspension assembly for a heavy duty truck or over-the-road vehicle includes a first beam pivotally mounted at its forward end to a hanger assembly depending from the vehicle chassis, a second beam connected to the first beam by a pair of bushings having resilient members therein, and an air spring extending between the second beam and the vehicle chassis. An upper torque arm extends between the axle housing and another chassis member to complete the substantial shape of a parallelogram to stabilize the axle as it deflects vertically with respect to the chassis. The vehicle axle is rigidly pivotally connected to the second beam so that the second beam moves with the axle about the longitudinal axis of the vehicle but the axle freely pivots in the fore and aft direction as required for parallelogram stabilization. Any longitudinal oscillation between the combination of the second beam and axle, and the chassis of the truck is absorbed and dampened by the resilient members in the pair of bushings connecting the first torque beam to the second torque beam. As the suspension substantially defines the shape of a parallelogram to control and stabilize the axle, the pitch of the axle remains virtually constant as the axle moves vertically with respect to the chassis.

11 Claims, 6 Drawing Figures

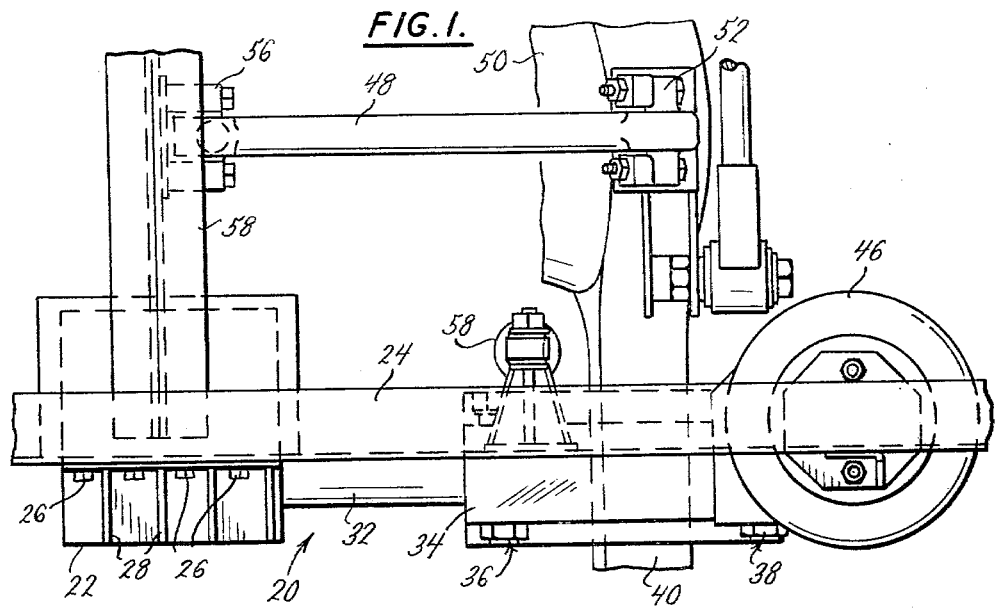
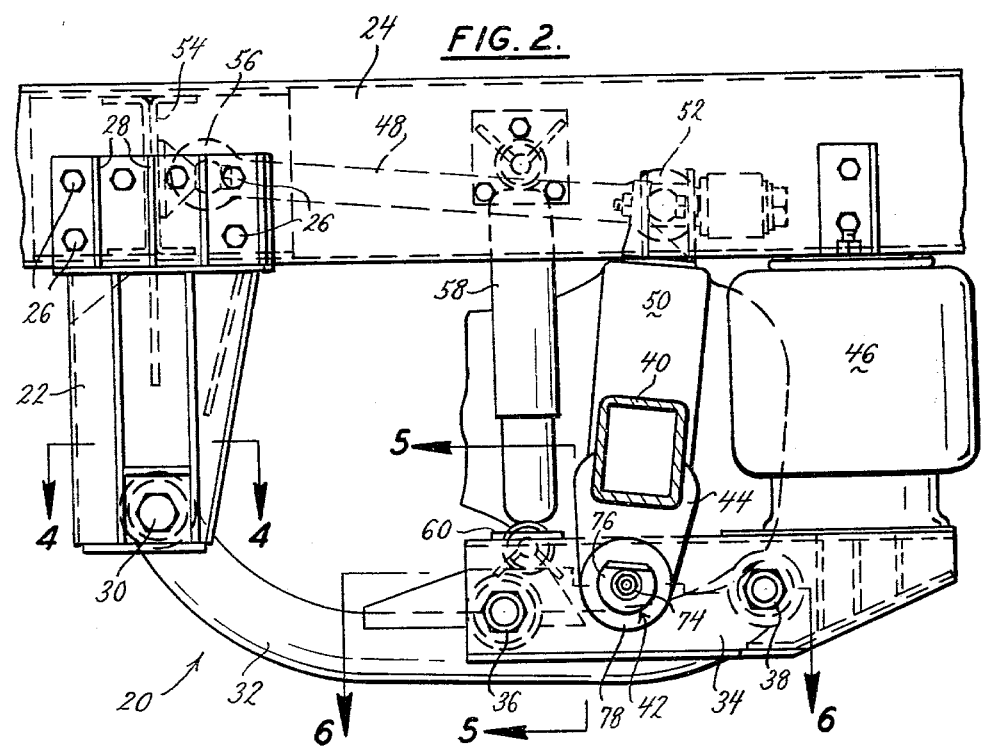

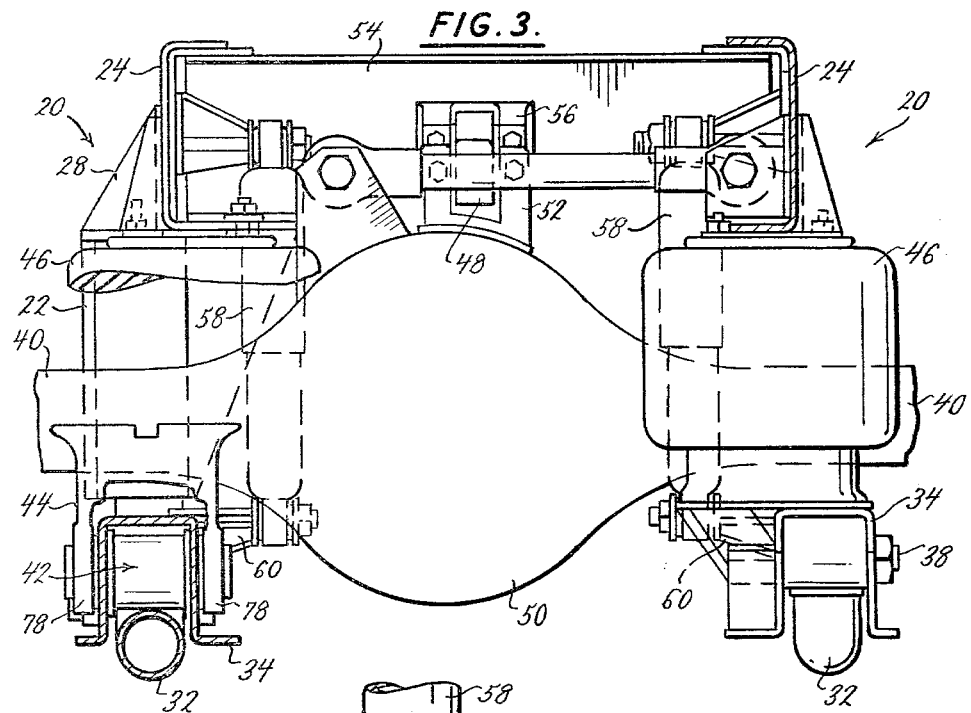
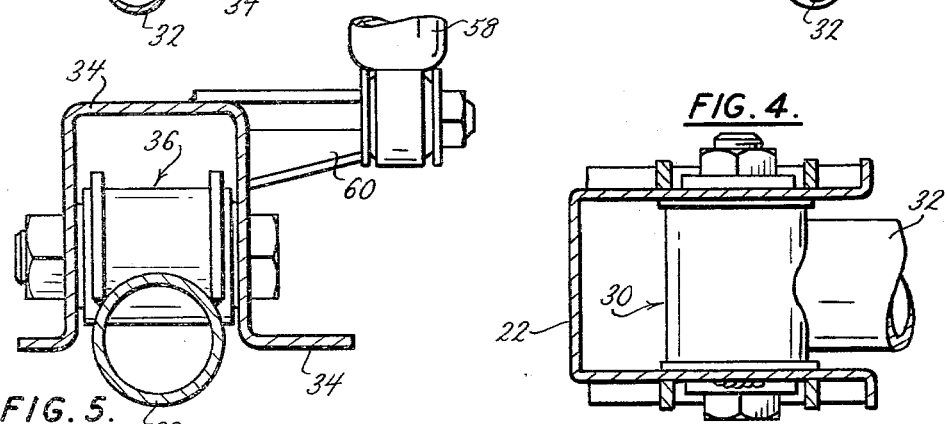
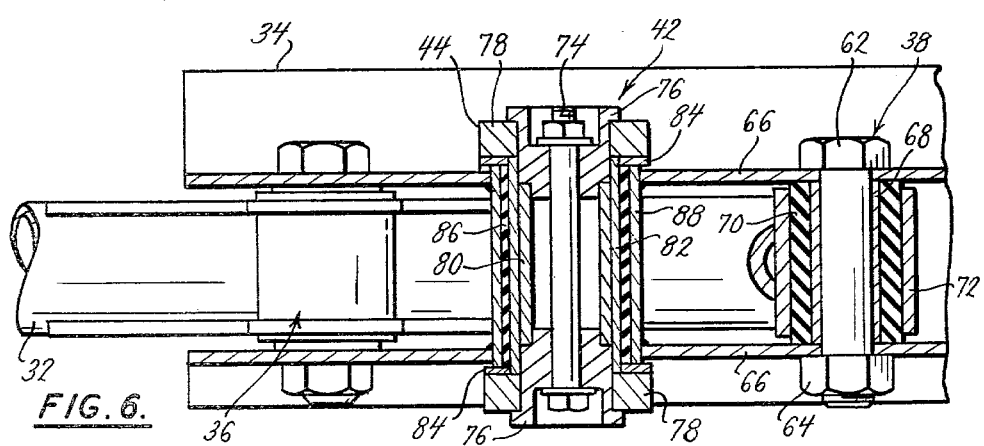

AIR SPRING SUSPENSION SYSTEM WITH PARALLELOGRAM STABILIZED AXLE AND ANTI-ROLL CONTROL

BACKGROUND AND SUMMARY

Suspensions are available in the prior art which utilize air springs to provide an extremely comfortable ride, even for large over-the-road type trucks and other heavy vehicles. However, one drawback of an air spring type suspension is that the mushiness of the air spring requires increased stabilization of the axle with respect to the chassis. Otherwise, the axle would have a tendency to overreact to inconsistencies in the road surface, causing an unsafe and unstable ride. Also, with an unstabilized axle and air spring suspension the relative distribution of the load over the bed of the truck would significantly affect the ride and driving characteristics, greatly reducing the versatility of the vehicle and requiring an inordinate amount of attention to placement of the load. Indeed, proper placement of some types of unbalanced loads might be impossible under some circumstances to ensure a stable and safe ride.

Applicant has previously invented and patented several air spring type suspensions which include parallelogram stabilization of the axle. The parallelogram type of axle stabilization has been found to be a significant advancement over the prior art. With applicant's patented air spring suspension on systems using parallelogram stabilization, a safe, stable, and comfortable ride for all types of loads has been achieved. Some of these suspensions are described in U.S. Pat. Nos. 4,114,923 and 4,132,432, the disclosures of which are incorporated herein by reference.

Another problem with air spring type suspensions is that they are particularly susceptible to oscillation of the axle about the longitudinal axis of the truck, i.e., from side to side. This is more of a problem in air spring suspensions because the air spring does not offer any resistance to longitudinal oscillation such as a leaf spring or other type of solid spring. To solve the problem of controlling the oscillation of the axle about the longitudinal axis of the truck, applicant has previously invented and patented a suspension which provides resilient bushings between a bolster beam and a torque beam, the axle being rigidly mounted to the booster beam. A fixed axle mount stabilizes the axle with respect to the suspension and is used instead of a parallelogram stabilized axle. In this suspension, longitudinal oscillation is controlled by the resilient members of the bushings so that flexing or oscillation of the bolster beam and axle assembly with respect to the torque beam is limited. This suspension is described in U.S. Pat. No. 3,801,086, the disclosure of which is incorporated herein by reference. Applicant's patented suspension providing resistance to longitudinal oscillation with a fixed axle mount is a good and useful invention which has also met with wide success in the industry.

Both types of air spring suspensions previously invented and patented by applicant offer features which were unavailable in the prior art. Applicant has now succeeded in combining the advantages of both of the suspensions by inventing an air spring type suspension which has parallelogram stabilizing of a pivotally mounted axle and also controls oscillation of the axle about the longitudinal axis of the truck. The suspension includes a first torque beam rigidly pivotally connected to a hanger assembly at one end with a pair of resilient bushings connecting it to a second beam. The axle is rigidly pivotally mounted to the second beam and an air spring extends between the second beam and the chassis. Thus, a solid pivotal connection is made between the axle and the second beam and all the longitudinal oscillation induced between the chassis and the suspension assembly is absorbed and controlled by the two resilient bushings connecting the first torque beam to the second beam. The spaced apart pair of bushings with resilient members provide a stable base to aid in controlling longitudinal oscillation of the chassis and provide much greater control than if a single resilient bushing were used.

The parallelogram is formed by the hanger assembly, the combination of the first and second torque beam, the axle seat and axle housing, and an upper torque rod which extends between the rear axle housing and a transverse chassis member. The upper torque arm and the first and second beam combination both form a lever which is pivotally attached to the chassis with the axle mounted therebetween so that upward or downward movement of the axle with respect to the chassis is controlled by these two levers. This controlled movement ensures that the pitch of the axle with respect to vertical remains virtually constant independently of the type of load or terrain.

The parallelogram action of the suspension is made possible through the rigid pivotal mounting of the axle to the second beam. This rigid pivotal mounting of the axle permits the axle to freely pivot in the fore and aft direction as it deflects vertically with respect to the chassis. However, longitudinal oscillatory forces have no effect on this rigid pivotal connection and instead are absorbed in the two resilient bushings connecting the first and second torque beams. Similarly, the first and second torque beams are fixedly attached to each other as they are joined a two points along their lengths. Therefore there is no allowable pivotal action between these two torque beams such as would interfere with the parallelogram stabilization of the axle. Through this scheme, applicant has combined the advantages of two separate suspensions in such a way that they are independent of one another and do not detract from either's function.

Thus, applicant's invention provides the advantages of an air-spring member for comfort and smoothness of ride, a parallelogram controlled axle which maintains the pitch of the axle virtually constant as the axle deflects vertically with respect to the chassis, and controlled oscillation of the axle about the longitudinal axis of the chassis, the oscillation control being accomplished by two resilient bushings being spaced apart to provide a base of stabilization to increase its effectiveness.

Applicant's new suspension system and some of the advantages thereof have been briefly described above. A more detailed description and explanation follows in the drawings and the description of the preferred embodiment.

BRIEF DESCRIPTION OF THE DRAWINGS

FIG. 1 is a top view of applicant's suspension system with a partial breakaway view of the surrounding vehicle axle and chassis.

FIG. 2 is a side elevational view of applicant's suspension system with a partial breakaway of the vehicle chassis and axle.

FIG. 3 is a rear view of the vehicle chassis and axle with a suspension mounted on either side.

FIG. 4 is a cross-sectional view taken along the plane of line 4—4 in FIG. 1 and detailing the front pivotal connection for the first torque beam.

FIG. 5 is a cross-sectional view taken along the plane of line 5—5 in FIG. 2 and detailing the resilient pivotal connection between the second torque beam and first torque beam and the mounting for the lower end of the shock absorber.

FIG. 6 is a cross-sectional view taken along the plane of line 6—6 in FIG. 2 and detailing the resilient bushings mounting the first torque beam to the second torque beam and the rigid pivotal connection between the axle mount and the second torque beam.

DETAILED DESCRIPTION OF THE FIRST EMBODIMENT

Applicant's suspension assembly 20 for one side of the vehicle is shown in FIGS. 1 and 2 for purposes of illustration and explanation. However, it is to be understood that a suspension assembly 20 is also used on the other side of the vehicle. More particularly, each assembly 20 includes a hanger assembly 22 extending downwardly from the chassis 24 and secured thereto with a plurality of bolts 26. Gusset plates 28 are provided to strengthen the hanger 22 as is known in the art. An eccentric bolt assembly 30 rigidly pivotally connects a first torque beam 32 to the lower end of hanger 22. The first torque beam 32 extends rearwardly and two connections join it to a second torque beam 34, consisting of resilient bushings 36 and 38.

Axle 40 is rigidly pivotally connected to the second torque beam 34 by bushing 42 and axle bracket 44. An air spring 46 is mounted to second torque beam 34 and extends between second beam 34 and chassis member 24. A central torque rod 48 is pivotally mounted atop rear axle housing 50 by bushing 52 and extends to chassis member 54 where a second bushing 56 pivotally mounts the opposite end of torque rod 48. A shock absorber 58 has its lower end mounted to a saddle bracket 60 secured to the second torque beam 34 and its upper end mounted to chassis member 24.

As described above, applicant's suspension assembly 20 provides parallelogram controlled movement of the axle 40 as the axle 40 deflects in the vertical direction with respect to the chassis 24. The first and second torque beams 32, 34 are resiliently connected by bushings 36, 38 and axle 40 is rigidly pivotally connected to the second torque beam 34 by bushing 42. Thus, the lower arm of the parallelogram is formed by the combination of the first and second torque beams 32, 34. The upper arm of the parallelogram is formed by torque rod 48 which is pivotally connected and extends between the rear axle housing 50 and the chassis member 54.

The above components have been shown and described generally, as would be readily understood by one of ordinary skill in the art. Further details of individual assemblies such as the rigid bushings, resilient bushings, torque beams, and other components are described and explained in greater detail in applicant's previous patents mentioned above.

The resilient bushing assemblies 36, 38 are best shown in FIG. 6 and include a bolt 62 and nut 64 extending between side frames 66 of second torque beam 34. A metallic sleeve 68 extends around the shank of bolt 62 and helps maintain the side frame 66 in its spaced apart condition as the bolt and nut assembly 62, 64 are tightened. A resilient member 70, which may be fabricated from rubber, elastomer or any other type of resilient material, surrounds the sleeve member 68 to provide the resilient action of the bushing assembly 36, 38. An outer metallic sleeve 72 is welded to the rear end of first torque beam 32 and surrounds the rubber bushing member 70 to secure the front torque beam 32 thereto.

The rigid pivotal mount for the axle 40 and axle bracket 44 provided by bushing 42 is also shown in cross-sectional detail in FIG. 6 and includes a bolt and nut assembly 74 tightened between two end plugs 76 to hold them in position against the ears 78 of axle bracket 44. An inner metallic sleeve 80 extends between end plugs 76 to avoid over-tightening. An inner bearing sleeve 82 surrounds the above described assembly and provides a first bearing surface for the bushing 42. Bearing sleeve 82 may be made of a self-lubricating fabric material. Two washers 84 are mounted at opposite ends of the bushing assembly 42 to prevent frictional buildup between the bushing 42 and ears 78. Bushing sleeve 86 surrounds inner bearing sleeve 82 and may also be made of a self-lubricating fabric material to lubricate the bushing and prevent frictional buildup at the bearing surfaces. An outer bearing sleeve 88 is welded to the side frames 64 of second torque beam 34 and supports the bushing assembly 42 therefrom. Thus, bushing assembly 42 provides a self-lubricating, rigid pivotal connection between the axle 40 and the second torque beam 34. It should be noted that there are no resilient members in this bushing assembly so that movement of the axle 40 with respect to the second torque beam 34 is limited to the fore and aft direction.

Operation

Applicant's suspension assembly 20 provides a pivotal mount for the axle, thus permitting parallelogram control of axle movement in combination with dampening of longitudinal oscillatory forces in a pair of spaced apart bushings having resilient members. The parallelogram control can be easily followed by picturing the axle in FIG. 2 moving either up or down with respect to the chassis member. The parallelogram is formed at the top by torque arm 48 pivotally extending between the rear axle housing and the cross-beam of the chassis; and at the bottom by the first and second torque beams which are connected by bushings and which extend between the axle and the hanger assembly. The sides of the parallelogram are formed by the hanger assembly and the axle and its housing. Thus, as the axle moves upwardly the upper and lower legs of the parallelogram pivot to maintain the axle in approximately the same pitch. The first and second torque beams remain fixed with respect to each other by virtue of the two bushing connections and the upper torque arm is free to pivot at both ends to accommodate axle movement.

Control of the tendency of the chassis to move about the longitudinal axis of the truck with respect to the axle is accomplished through the two bushing assemblies 36, 38 which connect the first torque beam to the second torque beam. Each of these bushing assemblies has a resilient member which dampens any movement between the axle and the chassis. The axle is pivotally connected in a rigid manner through bushing assembly 42 to the second torque beam. The first torque beam is rigidly connected to the chassis through eccentric bolt assembly 30. However, as explained, the connection between the first torque beam and second torque beam is comprised of the resilient bushing assemblies which permits the second torque beam to "flex" with respect to the first torque beam and thereby isolate movement of one from the other. This movement is also dampened considerably by the resiliency of the bushing members which eliminates any play which might otherwise be present in the assemblies due to manufacturing tolerances, assembly, and the like. The action of the resilient bushing members are more completely explained in applicant's previous U.S. Pat. No. 3,801,086, as mentioned above.

Thus, applicant's suspension assembly provides a combination of the unique features of several of applicant's previous suspension assemblies which were heretofore unavailable in a single suspension assembly. Some of these advantages include the comfort and ride of an air spring, parallelogram control for a pivotally mounted axle, anti-roll or longitudinal oscillation control through the use of bushings having resilient members, and other features which insure a safe and efficient ride.

Changes and modifications of applicant's invention would be apparent to one of ordinary skill in the art. These changes and modifications are included in the teaching of applicant's disclosure and applicant intends that his invention be limited only by the scope of the claims appended hereto.

I claim:

1. A vehicle suspension comprising a first beam, means for pivotally mounting the first beam to the vehicle chassis, a second beam, means for resiliently connecting the first beam to the second beam to permit limited longitudinal oscillation therebetween, spring means for extending between the second beam and the vehicle chassis, a torque rod adapted for pivotal connection between the axle and the chassis, and means for pivotally mounting the vehicle axle to the second beam so that said resilient connection means controls axle oscillation with respect to the longitudinal axis of the axle.

2. In a vehicle suspension having a first beam adapted for pivotal mounting to the chassis of a vehicle, a second beam, a spring means for extending between said second beam and the chassis, the improvement comprising a plurality of means resiliently mounting said second beam to said first beam to control the longitudinal oscillation between the second beam and the first beam and means to pivotally mount the vehicle axle to said second beam and to the chassis to permit fore and aft pivotal movement of said axle to maintain the pitch of the axle substantially constant as said axle deflects vertically with respect to the chassis.

3. The device of claim 1 wherein the forward end of the first beam is connected to the chassis, the rearward end of the first beam is connected to the second beam with at least one of said resilient connections, the spring means is mounted to the rearward end of the second beam, and the forward end of the second beam is connected to the first beam between its ends with at least one of said resilient connections.

4. The device of claim 1 wherein the spring means is an air spring.

5. The device of claim 1 further comprising a hanger assembly adapted to depend from the vehicle chassis, said first beam being adapted for pivotal connection to said hanger assembly.

6. The device of claim 1 wherein the resilient connecting means includes a pair of spaced apart bushing assemblies, each bushing having resilient means therein.

7. The device of claim 1 further comprising vertical oscillation dampening means for connecting between the second beam and the chassis.

8. A vehicle suspension comprising a hanger assembly depending downwardly from the vehicle chassis, a first curved torque beam pivotally mounted to the hanger and extending rearwardly therefrom, a second torque beam, two resilient bushings mounting the first torque beam to the second torque beam, said bushings being located in a spaced apart relationship, means to pivotally mount the axle to the second torque beam at a point between said two resilient bushings, said pivotal mount permitting movement of the axle in the fore and aft direction only, the resilient bushings having means to control oscillation of the axle about the longitudinal axis of the vehicle chassis, a torque rod pivotally connected between the axle and the chassis to generally form a parallelogram to control the pitch of the axle as the axle deflects vertically with respect to the chassis, and an air spring extending between the second torque beam and the chassis.

9. The suspension of claim 8 further comprising shock absorbing means extending between the second beam and the chassis.

10. The suspension of claim 1 wherein the torque rod forms one side of a parallelogram, and the first and second beams together form a second side of a parallelogram, the pitch of said axle being thereby stabilized by said parallelogram as it moves vertically with respect to the chassis.

11. The suspension of claim 2 wherein the axle mounting means includes a torque rod adapted for pivotal connection between the axle and the chassis, and a bushing extending between the axle and the second beam.

* * * * *